United States Patent
Ciccone et al.

(10) Patent No.: US 9,840,238 B2
(45) Date of Patent: Dec. 12, 2017

(54) AIRCRAFT ELECTRIC POWER CONVERSION AND DISTRIBUTION SYSTEM

(75) Inventors: Dennis M. Ciccone, Poland, OH (US); Michael J. Suponcic, Akron, OH (US)

(73) Assignee: Meggitt Aircraft Braking Systems Corporation OH (US)

( * ) Notice: Subject to any disclaimer, the term of this patent is extended or adjusted under 35 U.S.C. 154(b) by 683 days.

(21) Appl. No.: 12/987,206

(22) Filed: Jan. 10, 2011

(65) Prior Publication Data

US 2012/0175945 A1    Jul. 12, 2012

(51) Int. Cl.

| | |
|---|---|
| *B60L 1/00* | (2006.01) |
| *B60L 3/00* | (2006.01) |
| *H02G 3/00* | (2006.01) |
| *B60T 8/17* | (2006.01) |
| *H02J 3/02* | (2006.01) |
| *H02J 1/10* | (2006.01) |
| *H02J 3/38* | (2006.01) |

(52) U.S. Cl.
CPC ............ *B60T 8/1703* (2013.01); *H02J 1/102* (2013.01); *H02J 1/108* (2013.01); *H02J 3/02* (2013.01); *H02J 3/38* (2013.01)

(58) Field of Classification Search
CPC ......... B60K 6/42; B60W 20/00; B60W 10/26; B60W 10/04; H02G 3/00; H03F 3/38; F16D 55/22; Y02T 10/7005; Y02T 10/7077; B60R 16/03
USPC .............. 307/143, 142, 9.1, 151, 82, 44, 37; 303/3, 15, 9.66; 330/10, 109, 261, 262; 328/21, 162, 164; 363/71, 72, 98, 132, 363/65
See application file for complete search history.

(56) References Cited

U.S. PATENT DOCUMENTS

| | | | | |
|---|---|---|---|---|
| 3,801,920 | A * | 4/1974 | Strickland | ........................ 330/10 |
| 5,428,523 | A * | 6/1995 | McDonnal | ........................ 363/71 |
| 6,163,089 | A * | 12/2000 | Kull | ............................... 307/151 |
| 6,166,934 | A * | 12/2000 | Kajouke | ................... B60L 1/00 363/65 |
| 8,086,874 | B2 * | 12/2011 | Chapuis | ................... G06F 1/189 713/300 |

(Continued)

*Primary Examiner* — Rexford Barnie
*Assistant Examiner* — Jagdeep Dhillon
(74) *Attorney, Agent, or Firm* — Renner Kenner Greive Bobak Taylor & Weber Co., LPA

(57) ABSTRACT

An electric brake power conversion and distribution system for use in aircraft is provided. An array of DC-DC converters is interposed between a DC power source and a plurality of aircraft electric brake actuators. Each of the DC-DC converters has a characteristic output voltage. The DC-DC converters are interconnected in an additive series of connections to provide an output voltage to the plurality of aircraft electric brake actuators that comprises the sum of the characteristic voltages of the DC-DC converters that are enabled at a particular point in time. A controller manipulates an array of switches interconnected with the array of DC-DC converts, such that the controller can selectively enable or inhibit selected ones of the DC-DC converters, as desired. Accordingly different voltages can be made available for the electric brake actuators depending upon aircraft activity, such as landing, taxiing, parking, or in flight. The invention reduces the size, weight, cost, and associated heat buildup of prior power conversion and distribution systems.

10 Claims, 1 Drawing Sheet

(56) References Cited

U.S. PATENT DOCUMENTS

| | | | |
|---|---|---|---|
| 8,245,801 B2* | 8/2012 | Flett | 180/65.21 |
| 2008/0174177 A1* | 7/2008 | Langlois | H02J 1/08 |
| | | | 307/9.1 |
| 2008/0208491 A1* | 8/2008 | Burlak | H02H 3/12 |
| | | | 702/58 |
| 2009/0292408 A1* | 11/2009 | Shafaat | G01C 21/00 |
| | | | 701/4 |
| 2010/0244775 A1* | 9/2010 | Smith | 320/140 |
| 2011/0084550 A1* | 4/2011 | Nierlich | B64C 25/30 |
| | | | 307/9.1 |
| 2011/0100735 A1* | 5/2011 | Flett | 180/65.22 |

* cited by examiner

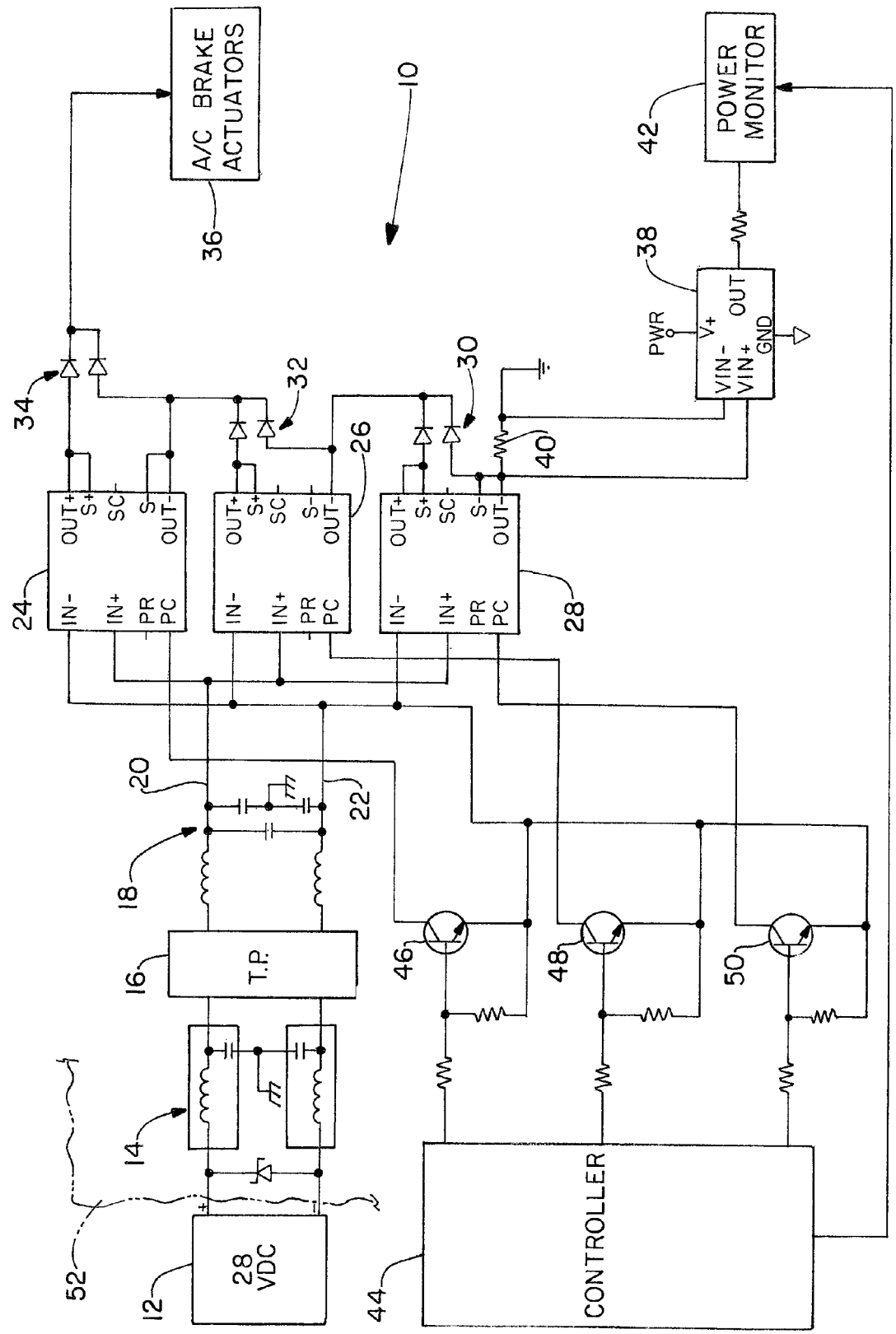

AIRCRAFT ELECTRIC POWER CONVERSION AND DISTRIBUTION SYSTEM

TECHNICAL FIELD

The invention herein resides in the art of aircraft electric actuation systems and, more particularly, to electric brake systems for aircraft. Specifically, the invention relates to a system for converting, distributing and selectively controlling the power necessary for actuating the motors of an aircraft electromechanical actuation system such as an electric brake system.

BACKGROUND OF THE INVENTION

Presently, many aircraft are employing motor-actuated brakes instead of the hydraulic brakes in the prior art. These electric brakes typically comprise an array of motor-driven actuators to move a pressure plate against a brake disc stack, causing frictional engagement between the rotors and stators thereof, to control the aircraft and/or bring it to a stop. The motors of brake actuators typically require high voltage levels and high energy consumption to effect their operation. In the past, power conversion for such electric brake systems has been through the use of transformer rectifier units that receive 115 volts AC power from the generating systems of the aircraft operating off of the aircraft engines, and convert the same to a high level DC voltage output for powering the motors of the brake actuators. However, such transformer rectifier units are cumbersome, heavy, expensive, and consume a significant amount of space. Each of these characteristics poses a problem in aircraft utility. Moreover, transformer rectifier units are not easily given to regulation and control of the power and heat generated during employment. Indeed, the prior art left much to be desired with regard to regulating power consumption and limiting heat generation.

There is a need in the art for an aircraft electric brake power conversion and distribution system that eliminates the requirement for transformer rectifier units, and which is given to control and regulation, greatly increasing the efficiency of the power generating unit. In view of the prior art, there is a need for a system whereby power generation may be integrated with the electronic control unit for the brake, which can be regulated to such an extent as to reduce power consumption and undesired heat generation. Indeed, the prior art demonstrates a need for simplified power conversion and distribution circuitry over the prior structures and techniques.

DISCLOSURE OF INVENTION

In light of the foregoing, it is a first aspect of the invention to provide an aircraft electric actuation system with power conversion and distribution that reduces the thermal effects and power demands of the entire system over previously known structures and methodologies.

Another aspect of the invention is the provision of an aircraft electric brake power conversion and distribution system that is integral to the electronic control unit for the brake system.

A further aspect of the invention is the provision of an aircraft electric power conversion and distribution system for actuators that accommodates selectively enabling and disabling sections thereof, consistent with aircraft demands, thereby enhancing the thermal characteristics of the power generating unit while saving power.

Still a further aspect of the invention is the provision of an aircraft electric power conversion and distribution system that does not rely upon transformer rectifier units, but provides compact, light weight, relatively inexpensive, and space saving features over the prior art.

Yet another aspect of the invention is the provision of an aircraft electric brake power conversion and distribution system that is adaptable to provide the requisite voltage and power for braking operations of various types.

An additional aspect of the invention is the provision of an aircraft electric power conversion and distribution system that greatly enhances operational efficiency over the prior art.

The foregoing and other aspect of the invention that will become apparent as the detailed description proceeds are achieved by a power conversion and distribution system for an aircraft electric actuator, comprising: a DC power source; an array of DC-DC converters connected to said DC power source; an aircraft electric actuator connected to said array of DC-DC converters, said actuator being driven by a DC output voltage from said array of DC-DC converters; and a controller selectively enabling certain of said DC-DC converters of said array of DC-DC converters.

Other aspects of the invention that will become apparent herein are achieved by a power conversion and distribution system for aircraft electric brakes, comprising: a DC power source; an array of DC-DC converters connected to said DC power source, each DC-DC converter having a characteristic output voltage; a controller operatively connected to and selectively enabling certain of said DC-DC converters of said array; and a plurality of aircraft electric brake actuators connected to said array of DC-DC converters, said brake actuators being controlled by a DC output voltage from said array of DC-DC converters, said output voltage being a function of the number and characteristic output voltages of said DC-DC converters enabled by said controller.

DESCRIPTION OF DRAWINGS

For a complete understanding of the various aspects, structures and techniques of the invention, reference should be made to the following detailed description and accompanying drawing wherein there is shown a schematic diagram of an aircraft electric brake power conversion and distribution system made in accordance with the invention

BEST MODE FOR CARRYING OUT THE INVENTION

The concept of the invention herein has a broad range of applications in aircraft electric power conversion and distribution to actuators and the like. Herein, the invention is presented in the context of a preferred embodiment directed to an electromechanical actuation system for an aircraft electric brake system, but the application of the invention is not so limited, but may be extended to a variety of power conversion and distribution systems for aircraft.

Referring now to the drawing, it can be seen that an aircraft electric brake power conversion and distribution system made in accordance with the invention is designated generally by numeral 10. The power conversion and distribution system 10 is connected at its input to the 28 volt DC power bus 12 common on most aircraft. The 28 volt DC power bus is tied to a source which may be a battery, an aircraft generator system tied to the aircraft engines, or a combination of the two. An input filter network 14, of an inductive/capacitive nature, receives the 28 volt DC input and passes it to a transient protector 16, which passes that voltage source again through output inductive/capacitive filters 18. Accordingly, there is provided to the active portion of the power conversion and distribution system 10 an appropriately filtered and buffered power supply of 28 volts DC across the power lines 20, 22. These power lines are then appropriately connected to an array of DC-DC converters 24, 26, 28, as shown. The power line 20 is connected to the positive input of each of the converters 24-28, while the power line 22 is connected to the negative inputs thereof. Those skilled in the art will appreciate that the DC-DC converters 24-28 serve to step up the input voltage to a set level. The converters 24, 26 increase the 28 volt DC input to 36 volt DC outputs, while the converter 28 steps up the 28 volt DC input to a 48 volt DC output. Of course, the output level may be selected according to the needs of the aircraft actuators.

As shown, the outputs of the DC-DC converters 24-28 are connected in additive series fashion through associated blocking diode pairs 30, 32, 34. The voltage output is thus applied to one or more aircraft brake actuators 36, the same being the additive output of the enabled and active DC-DC converters 24-28. It will be appreciated that the blocking diodes 30-34 provide isolation and redundancy for the DC-DC converters 24-28, such that removal or failure of any one of the DC-DC converters does not inhibit or affect the operation of the other(s).

A current sensor 38 is connected across a resistor 40 to monitor the voltage drop thereacross and, accordingly, the current therethrough. Being at the end of the current flow path between the DC-DC converters 24-28, the current thus corresponds to the total current drain of the converters and, with the characteristic voltage of the enabled converters being known from the controller 44, the power generated can be determined and provided as by a power monitor 42.

A particularly beneficial feature of the invention is the ability to selectively enable/disable selective ones and combinations of the DC-DC converters 24-28. To this end, a controller 44 is provided in conjunction with resistors 46, 48, 50, respectively associated with the DC-DC converters 24, 26, 28. These switching transistors, under control of the controller 44, allow for selectivity of the enablement of the various converters 24-28 and, accordingly, the output voltage, current drain, and heat generation of the power conversion and distribution system 10. As presented above, the blocking diode pairs 30-34 serve to isolate the series connected converters from each other, such that the output to the aircraft brake actuators 36 is solely a function of the enabled DC-DC converters 24-28.

The converters 24, 26 each provide an output of 36 volts DC, while the converter 28 provides an output of 48 volts DC. Accordingly, by appropriate activation of the switching transistors 46-50 by the controller 44, the output available to the one or more aircraft brake actuators 36 are DC voltages of 36, 48, 72, 84 and 120 volts. This selectability allows for accommodating full braking activity with the combined outputs of the 3 DC-DC converters available, while taxiing may be at a first reduced level, parking at yet another level, and in-flight activity at still a different level. Of course, the various combinations of enabled converters, and the situations requiring the same, may vary from aircraft to aircraft.

According to an embodiment of the invention, the power conversion and distribution system 10 is housed within, and integrated with, the electronic control unit 52 of the aircraft. The control unit 52 houses the circuitry of the aircraft brake control system other than that at the brakes themselves. Accordingly, significant economies in weight and space consumption are enjoyed, along with reductions in cost and heat generation associated with power conversion, distribution and control Thus it can be seen that the various aspects of the invention have been attained by the structure and operation discussed above. While in accordance with the patent statutes only the best mode and preferred embodiment of the invention has been presented and described in detail, the invention is not limited thereto or thereby. Accordingly, for an appreciation of the true scope and breadth of the invention reference should be made to the following claims.

What is claimed is:

1. A power conversion and distribution system for an aircraft electric actuator, comprising:
    a DC power source;
    an array of DC-DC converters connected to said DC power source;
    an aircraft electric actuator connected to said array of DC-DC converters in additive series connection, said actuator being driven by a DC output voltage from said array of DC-DC converters;
    a controller selectively enabling certain of said DC-DC converters of said array of DC-DC converters and wherein said DC-DC converters have characteristic output voltages that are summed through blocking diodes at the outputs thereof to generate said DC output voltage; and
    a current sensor interconnected with said DC-DC converters for sensing an amount of current drawn from said DC-DC converters.

2. A power conversion and distribution system for an aircraft electric actuator according to claim 1, wherein said controller selectively activates switches connected to said DC-DC converters of said array of DC-DC converters.

3. A power conversion and distribution system for an aircraft electric actuator according to claim 2, wherein said switches comprise transistors.

4. A power conversion and distribution system for an aircraft electric actuator according to claim 2, wherein said DC output voltage is of an amplitude determined by said DC-DC converters enabled by said controller.

5. A power conversion and distribution system for an aircraft electric actuator according to claim 4, wherein said aircraft electric actuator comprises a brake actuator.

6. A power conversion and distribution system for an aircraft electric actuator according to claim 5, wherein said controller enables selected ones of said DC-DC converters of said array of DC-DC converters as a function of aircraft activities taken from a group comprising landing, taxiing, parking and flying.

7. A power conversion and distribution system for an aircraft electric actuator according to claim 1, further comprising a power monitor operatively connected to said current sensor, said power monitor determining an amount of power provided by said array of DC-DC converters.

8. A power conversion and distribution system for an aircraft electric actuator according to claim 6, further comprising a filter network and transient protector interposed between said DC power source and array of DC-DC converters.

9. A power conversion distribution system for aircraft electric brakes, comprising:
    a DC power source;
    an array of DC-DC converters connected to said DC power source, each DC-DC converter having a characteristic output voltage;

a controller operatively connected to and selectively enabling certain of said DC-DC converters of said array;

a plurality of aircraft electric brake actuators connected to said array of DC-DC converters, said brake actuators being controlled by a DC output voltage from said array of DC-DC converters, said output voltage being a function of the number and characteristic output voltages of said DC-DC converters enabled by said controller, said array of DC-DC converters being in additive series connection through associated blocking diodes with said plurality of aircraft electric brake actuators;

an array of switches interposed between said controller and said array of DC-DC converters, wherein said controller enables said DC-DC converters through said array of switches as a function of aircraft activity; and a current sensor interconnected with said DC-DC converters for sensing an amount of current drawn from said DC-DC converters.

10. A power conversion and distribution system for aircraft electric brakes according to claim 9, wherein said aircraft activity is taken from the group of activities comprising landing, taxiing, parking and flying.

* * * * *